United States Patent [19]

Rothgery et al.

[11] 4,389,327
[45] Jun. 21, 1983

[54] USE OF SELECTED 1,2-DIHYDRO-1,2,4,5-TETRAZINES AS OXYGEN-SCAVENGING AGENTS

[75] Inventors: Eugene F. Rothgery, North Branford; Robert N. Scott, Wallingford, both of Conn.

[73] Assignee: Olin Corporation, New Haven, Conn.

[21] Appl. No.: 387,989

[22] Filed: Jun. 14, 1982

[51] Int. Cl.³ ............... C09K 15/16; C09K 15/18
[52] U.S. Cl. ....................... 252/188.28; 210/750; 252/180; 252/8.55; 252/389 R; 422/16; 423/219; 426/262; 426/541
[58] Field of Search ........... 252/188.28, 180, 8.55, 252/389 R; 422/16; 423/219; 426/262, 541

[56] References Cited

U.S. PATENT DOCUMENTS

| | | | |
|---|---|---|---|
| 3,551,349 | 12/1970 | Kallfass | 252/392 |
| 3,843,547 | 10/1974 | Kaufman et al. | 252/392 |
| 3,983,048 | 9/1976 | Schiessl et al. | 252/389 R |
| 4,012,195 | 3/1977 | Noack | 252/389 R |
| 4,022,711 | 5/1977 | Noack | 252/389 R |
| 4,022,712 | 5/1977 | Noack | 252/389 R |
| 4,026,664 | 5/1977 | Noack | 252/389 R |
| 4,079,018 | 3/1978 | Noack | 252/389 R |
| 4,096,090 | 6/1978 | Noack | 252/389 R |
| 4,269,717 | 5/1981 | Slovinsky | 210/750 |
| 4,278,635 | 7/1981 | Kerst | 422/14 |
| 4,279,767 | 7/1981 | Muccitelli | 422/16 |
| 4,282,111 | 8/1981 | Ciuba | 422/13 |

OTHER PUBLICATIONS

Evaluation of New Oxygen Scavengers; Dionisio G. Cuisia; Presented at The Int'l Corrosion Forum; Apr. 6–10, 1981, Toronto, Canada.
Selected Physiochemical Methods in Evaluating a New Oxygen Scavenger; Manfred G. Noack; Presented at The Int'l Corrosion Forum; Apr. 6–10, 1981.
Hofmann and Ehrhardt, Ber 2731, (1912).
Wiley et al., J. Org. Chem., 22, 835 (1957).
Cartius et al., Ber 40, 836 (1907).

Primary Examiner—Irwin Gluck
Attorney, Agent, or Firm—W. A. Simons; T. P. O'Day

[57] ABSTRACT

Disclosed is a method for removing dissolved oxygen from a liquid (e.g., aqueous) system which comprises adding to said liquid system an effective amount of an oxygen-scavenging chemical selected from 1,2-dihydro-1,2,4,5-tetrazines of the formula

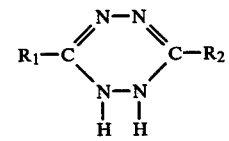

wherein $R_1$ and $R_2$ are individually selected from lower alkyl groups having 1 to 4 carbon atoms and phenyl.

7 Claims, No Drawings

USE OF SELECTED 1,2-DIHYDRO-1,2,4,5-TETRAZINES AS OXYGEN-SCAVENGING AGENTS

BACKGROUND OF THE INVENTION

1. Field of the Invention

The present invention relates to the use of selected 1,2-dihydro-1,2,4,5-tetrazines as oxygen-scavengers in liquid systems.

2. Description of the Prior Art

Dissolved oxygen in liquids such as water may cause extensive pitting and other forms of corrosion to metal surfaces coming in contact with these liquids. For example, this corrosion may cause serious problems to boiler systems and the like.

Accordingly, removal of oxygen from liquid streams and systems is highly desirable in many instances. Such deoxygenation can be carried out by either mechanical or chemical means or with both. In those situations where chemical deoxygenation is desired, various chemicals including sodium sulfite, hydrazine, and hydroquinone have been employed as chemical oxygen-scavengers. See U.S. Pat. Nos. 3,551,349 (Kallfass); 3,843,547 (Kaufman et al); 3,983,048 (Schiessl); 4,012,195 (Noack); 4,022,711 (Noack); 4,022,712 (Noack); 4,026,664 (Noack); 4,079,018 (Noack); 4,096,090 (Noack) and 4,269,717 (Slovinsky) as teaching of the use of hydrazine or similar compounds as oxygen-scavengers and corrosion inhibitors. See U.S. Pat. Nos. 4,278,635 (Kerst); 4,279,767 (Muccitelli); and 4,282,111 (Ciuba) as teaching of the use of hydroquinone and the like as an oxygen-scavengers. All of these cited U.S. Patents are incorporated herein by reference in their entireties.

While much work has been accomplished in this area, there is still a need to find more effective oxygen-scavengers for particular liquid systems. It is believed that the present invention presents a solution to this need.

BRIEF SUMMARY OF THE INVENTION

The present invention, therefore, is directed to a method for removing dissolved oxygen from a liquid system, which comprises adding to the liquid system an effective amount of an oxygen-scavenging chemical selected from 1,2-dihydro-1,2,4,5-tetrazines of the formula (I):

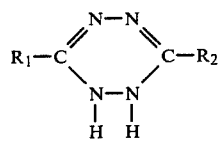

(I)

wherein $R_1$ and $R_2$ are individually selected from the group consisting of lower alkyl groups having 1 to 4 carbon atoms and phenyl.

Specifically, it has been found that the 1,2-dihydro-1,2,4,5-tetrazines of the present invention react rapidly with dissolved oxygen, even at ambient temperatures and without need for catalysts.

DETAILED DESCRIPTION

The dihydrotetrazines of Formula (I) may be made by a variety of methods. For example, they may be made by reacting hydrazine with an amidine or its hydrochloride salt, as illustrated in the following equation (A) where 3,6-dimethyl-1,2-dihydro-1,2,4,5-tetrazine is made by reacting hydrazine with acetamidine hydrochloride:

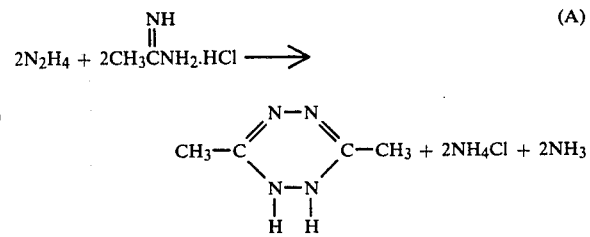

(A)

Also, they may be made by reacting hydrazine with an oxazoline, as illustrated in the following equation (B) where 3,6-diethyl-1,2-dihydro-1,2,4,5-tetrazine is made by reacting hydrazine with 2-ethyl-2-oxazoline:

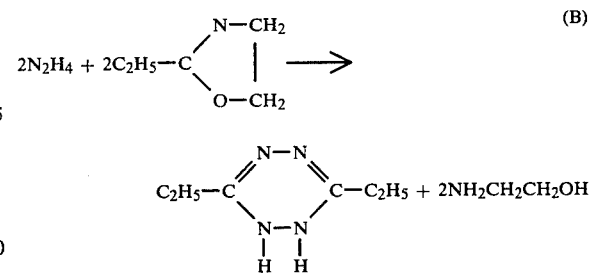

(B)

Further, these dihydrotetrazines may be made by reacting hydrazine with a nitrile, as illustrated by the following equation (C) where 3,6-diphenyl-1,2-dihydro-1,2,4,5-tetrazine is made by reacting hydrazine with benzonitrile:

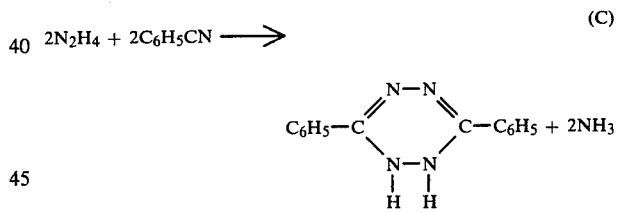

(C)

In any event, the particular method and reaction conditions for making these dihydrotetrazines are not critical features of the present invention and any suitable method may be used.

The method of the present invention may be used to rapidly remove dissolved oxygen from liquids such as water solutions (e.g., those used in boilers, hot water systems, cooling towers, water injection systems for oil wells, and the like), organic solvents such as xylene, glycol ethers, and the like, and aqueous salt solutions. The reaction between a dihydrotetrazine and oxygen is illustrated in the following equation (D) wherein 3,6-dimethyl-1,2-dihydro-1,2,4,5-tetrazine is employed as the oxygen-scavenger:

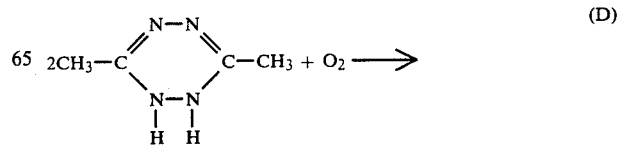

(D)

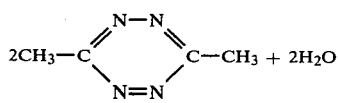

Since these dihydrotetrazines are consumed during oxygen removal, their concentration in the treated liquid should be determined periodically and additional dihydrotetrazine may be added to maintain an effective oxygen-scavenging amount in the liquid.

The particular amount of dihydrotetrazine compounds needed in each liquid system to effectively scavenge oxygen from the liquid system is mainly dependent upon the amount of oxygen actually present therein. It is generally desirable that at least 2.0 moles of these tetrazine compounds be used per mole of dissolved $O_2$ present in the liquid system. Of course, levels of these dihydrotetrazines considerably in excess of 2.0 moles per mole of $O_2$ may be required, particularly for treating liquid systems under static conditions. Generally, treatment levels up to 100 moles or more of dihydrotetrazine compound per mole of $O_2$ are believed to be effective for most operations.

These dihydrotetrazines may be employed at temperatures from about 0° C. to about 60° C. and at pressures up to about 400 atmospheres or more. Generally, these dihydrotetrazine compounds may be mixed into the liquid system by any suitable mixing technique such as mechanical agitation or the like in order to maintain the oxygen concentration therein at a desirable low level.

In one preferred embodiment of the present invention, the dihydrotetrazines shown in Formula (I), above, are used to remove oxygen from water in boilers. Generally, these compounds are added to the feed water stream to the boiler, although they may be used according to any of the techniques described for boiler water treatment in any of the above-noted U.S. Patents instead of hydrazine or hydroquinone.

The following examples are given to better illustrate the present invention. All parts and percentages are by weight, unless otherwise explicitly stated.

EXAMPLE 1

PREPARATION OF 3,6-DIMETHYL-1,2-DIHYDRO-1,2,4,5-TETRAZINE

Acetamidine hydrochloride (22.5 g, 0.25 mole) was placed in 150 ml of 2-propanol. The system was purged with nitrogen gas and anhydrous hydrazine (8 ml, 0.25 mole) was added. The reaction exothermed to 40° C. with the formation of a white solid. The mixture was stirred 45 minutes at room temperature, then heated to 45° C. and filtered under nitrogen. The filtrate was stripped to ⅔ volume of its initial volume and cooled to obtain pink product, 4 g, mp 109°–112° C. (compared to literature mp of 114° C.).

Weighed amounts of this compound were placed in 100 ml volumetric flasks and diluted with deoxygenated, deionized water. Aliquots of this mixture were injected in the test cell as shown in Example 4.

EXAMPLE 2

PREPARATION OF 3,6-DIETHYL-1,2-DIHYDRO-1,2,4,5-TETRAZINE

In a nitrogen flushed flask were mixed 2-ethyl-2-oxazoline (99 g, 1 mole) and anhydrous hydrazine (32 g, 1 mole) in 150 ml of tetrahydrofuran. The mixture was heated 2 hours at 60° C. to obtain a yellow solution. The solvent was stripped to give a pale yellow oil. On standing, white crystals formed. They were recrystallized from 2-propanol to give 3,6-diethyl-1,2-dihydro-1,2,4,5-tetrazine as identified by mass spectroscopy, $^{13}C$ NMR, and infrared analyses, mp 118.5°–119.5° C.

Again, weighed amounts of this compound were placed in 100 ml volumetric flasks and diluted with deoxygenated, deionized water. Aliquots of this mixture were injected into the test cell as shown in Example 4.

EXAMPLE 3

PREPARATION OF 3,6-DIPHENYL-1,2-DIHYDRO-1,2,4,5-TETRAZINE

Benzonitrile (52 ml, 0.5 mole) and anhydrous hydrazine (16 ml, 0.5 mole) were heated at 90°–109° C. for 14 hours under nitrogen gas to give an orange solid. Recrystallization from toluene gave 12 g of orange-pink solid of melting point 177°–178° C. (compared to literature mp of 181° C.).

Analysis for $C_{14}H_{12}N_4$: Calc: C, 71.19; H, 5.08; N, 23.73. Found: C, 71.31; H, 5.30; N, 23.04.

Aliquots of this compound were prepared as in Examples 1 and 2 and injected into the test cell as shown in Example 4, except the injected solutions were made with deoxygenated dimethylformamide since this compound has limited water solubility.

EXAMPLE 4

The following experimental laboratory work shows that the above-made 1,2-dihydro-1,2,4,5-tetrazines are effective deoxygenation agents at ambient temperature (i.e., at about 25° C.).

These deoxygenation measurements were run in a one liter round bottom flask equipped with a small septum-covered side arm and a standard taper joint into which was inserted the probe of an oxygen meter (Model 54 made by Yellow Springs Instrument Co. of Yellow Springs, Ohio). For each test, the flask was filled with air-saturated, buffered (with $Na_2CO_3/NaHCO_3$ to pH of 9.5) distilled water. The amount of dissolved $O_2$ content in the water was $2.4 \times 10^{-4}$ moles.

After filling with water, the probe was inserted into the flask and a sample of the compound made in Examples 1, 2, or 3 was injected through the side arm.

The times required for removal of half of the dissolved oxygen were measured ($T_{\frac{1}{2}}$). Also, the times for removal of 90% of the oxygen ($T_{9/10}$) were also measured if under 10 minutes. See these results in Table I with comparative times for hydrazine, a known oxygen-scavenger.

TABLE I

| Compound Tested | Amount of Compound (moles) | ($T_{\frac{1}{2}}$) | ($T_{9/10}$) |
|---|---|---|---|
| 3,6-dimethyl-1,2-dihydro-1,2,4,5-tetrazine | $7.2 \times 10^{-4}$ | 1.5 minutes | 2.2 minutes |
|  | $12.0 \times 10^{-4}$ | 0.12 | 0.30 |
| 3,6-diethyl-1,2-dihydro-1,2,4,5-tetrazine | $2.4 \times 10^{-4}$ | 7.5 | — |
|  | $7.2 \times 10^{-4}$ | 0.9 | 1.5 |
|  | $12.0 \times 10^{-4}$ | 0.6 | 0.9 |
| 3,6-diphenyl-1,2-dihydro-1,2,4,5-tetrazine | $2.4 \times 10^{-4}$ | 6 | — |
| hydrazine | $12.0 \times 10^{-4}$ | >10 | — |

As can be seen from Table I, all the compounds of the present invention are better oxygen-scavengers in this system than hydrazine. In particular, the lower alkyl-substituted tetrazines are much better than hydrazine.

What is claimed is:

1. A method for removing dissolved oxygen in a liquid system, which comprises adding to said liquid system an effective amount of an oxygen-scavenging chemical selected from 1,2-dihydro-1,2,4,5-tetrazines of the formula

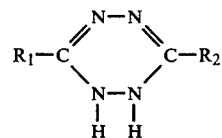

wherein $R_1$ and $R_2$ are individually selected from the group consisting of lower alkyl groups having 1 to 4 carbon atoms and phenyl.

2. The method of claim 1 wherein $R_1$ and $R_2$ are the same.

3. The method of claim 2 wherein $R_1$ and $R_2$ are both methyl.

4. The method of claim 2 wherein $R_1$ and $R_2$ are both ethyl.

5. The method of claim 2 wherein $R_1$ and $R_2$ are both phenyl.

6. The process of claim 1 wherein at least 20 moles of said oxygen-scavenging chemical are added for each mole of dissolved oxygen in said liquid system.

7. The process of claim 1 wherein said liquid system is an aqueous system.

* * * * *